US006868267B1

(12) United States Patent
Briggs et al.

(10) Patent No.: US 6,868,267 B1
(45) Date of Patent: Mar. 15, 2005

(54) APPARATUS, METHOD, AND ARTICLE OF MANUFACTURE USED TO INVOICE FOR SERVICES CONSUMED IN A COMMUNICATIONS NETWORK

(75) Inventors: Robert D. Briggs, Carlsbad, CA (US); Jason Kenagy, San Diego, CA (US); Gina Lombardi, San Diego, CA (US); Stephen A. Sprigg, Poway, CA (US); Kent D. Baker, San Diego, CA (US); Marc S. Phillips, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 432 days.

(21) Appl. No.: 09/716,042

(22) Filed: Nov. 17, 2000

(51) Int. Cl.[7] ............................................. H04M 11/00
(52) U.S. Cl. ...................... 455/406; 455/407; 455/408; 379/100.04; 379/114.01; 379/114.03; 705/40
(58) Field of Search ................................ 455/406, 422, 455/407, 408, 414; 379/91.01, 100.04, 114.01, 114.03, 144.05; 705/40, 418

(56) References Cited

U.S. PATENT DOCUMENTS

| | | | | |
|---|---|---|---|---|
| 5,003,584 A | * | 3/1991 | Benyacar et al. ............ | 379/119 |
| 5,475,740 A | * | 12/1995 | Biggs, Jr. et al. ......... | 379/91.02 |
| 5,619,247 A | * | 4/1997 | Russo ......................... | 725/104 |
| 5,825,883 A | | 10/1998 | Archibald et al. ............ | 380/25 |
| 5,845,267 A | * | 12/1998 | Ronen ......................... | 705/40 |
| 5,946,670 A | * | 8/1999 | Motohashi et al. .......... | 705/400 |
| 6,009,154 A | * | 12/1999 | Rieken et al. ............ | 379/114.2 |
| 6,141,652 A | * | 10/2000 | Reeder ......................... | 705/53 |
| 6,243,450 B1 | * | 6/2001 | Jansen et al. .......... | 379/144.01 |
| 6,549,770 B1 | | 4/2003 | Marran ......................... | 455/419 |
| 6,553,108 B1 | * | 4/2003 | Felger ......................... | 379/144 |
| 6,628,934 B2 | | 9/2003 | Rosenberg et al. .......... | 455/411 |
| 2002/0069176 A1 | | 6/2002 | Newman et al. .............. | 705/53 |
| 2002/0128984 A1 | | 9/2002 | Mehta et al. .................. | 705/71 |
| 2002/0172165 A1 | | 11/2002 | Xu et al. ..................... | 709/228 |
| 2003/0046396 A1 | | 3/2003 | Richter et al. .............. | 709/226 |
| 2003/0131404 A1 | | 7/2003 | Mehta et al. ................ | 370/352 |

FOREIGN PATENT DOCUMENTS

| | | | | |
|---|---|---|---|---|
| WO | WO9617466 | 6/1996 | ......... | H04M/15/00 |
| WO | WO0024161 | 4/2000 | ......... | H04L/12/14 |
| WO | WO0150312 | 7/2001 | ......... | G06F/17/00 |

* cited by examiner

*Primary Examiner*—William Trost
*Assistant Examiner*—Stephen D'Agosta
(74) *Attorney, Agent, or Firm*—Philip Wadsworth; Robert O'Connell

(57) ABSTRACT

An apparatus, method, and article of manufacture that provides an efficient way to invoice the users of a communication system (100) for the system resources consumed. Invoicing is based upon flexible criteria that can be adapted depending upon the charges a resource provider charges. For example, a user may incur a one-time charge for downloading a desired application program, or the user may be charged a download fee plus a recurring monthly fee for having continual access to the program and any updates to the program. A fee might also be charged for each time the application is used. These fees are recorded as debits and transferred to an invoicing location where an invoice reflecting the debits is constructed. For example, the debits may comprise fees for wireless service access, Internet service access, downloaded application programs, data, multimedia services, or other fees.

3 Claims, 5 Drawing Sheets

APPARATUS, METHOD, AND ARTICLE OF MANUFACTURE USED TO INVOICE FOR SERVICES CONSUMED IN A COMMUNICATIONS NETWORK

BACKGROUND OF THE INVENTION

1. Field of the Invention

The present invention relates to billing services. More particularly, the invention concerns a method, apparatus, and article of manufacture used to bill for services consumed by a user of communication services.

2. Description of the Related Art

As wireless communication systems and the Internet have matured, it has become possible to offer more than mere voice communication to a user of $r_1$ a wireless communication system (wireless user). Traditionally, a wireless telephone was used similarly to a terrestrial based telephone to speak with another person or to send a simple message. Today, as second (2G) and third generation (3G) wireless communication systems have developed, it is possible do much more. For example, a wireless user can access the Internet via a wireless mobile unit and watch a movie, or play a game with other wireless users. However, to use a wireless system for a particular purpose, the wireless user must use a wireless mobile unit that is configured for the particular use. A wireless mobile unit is any wireless communication device used to communicate information in a wireless communication system, such as a cellular or personal communications system (PCS) mobile telephone, a personal digital assistant (PDA) such as a Palm Pilot™, or other such devices. The wireless user must also have access to the particular software application program they wish to use. Commonly, these software configurations and application programs (software) are not contained in the wireless user's mobile unit, and must be downloaded from a source external to the mobile unit.

When software is downloaded, the software supplier usually wants to collect money for the software. Currently, to collect a fee, the software supplier has two options. One, they must setup a direct relationship with the wireless user who desires to download the application. This is commonly done with personal computers wherein a customer submits a credit card number to the supplier prior to downloading the software. However, the smaller size of wireless mobile units as compared to personal computers renders this technique arduous and almost impossible. Entering your name, address, the 16-digit card number, the expiration date of the card, as well as any other information required is not convenient using the keypad of a wireless mobile unit.

An alternative solution is for the software supplier to setup a relationship with the wireless user's service provider to offer the software. The service provider pays a royalty to the software supplier, and makes the software available to users that subscribe to the service provider. The service provider collects a fee, either directly or indirectly from the user, when specific software is downloaded. For example, NTT DoCoMo in Japan performs this latter model for downloading screen savers to wireless mobile units, wherein NTT DoCoMo is the wireless service provider.

Usually configurations and application programs are offered as part of a larger package of software and services. Unfortunately, this causes the wireless user to essentially pay for programs and services that he or she may not use. Further, this service method is lacking because the software supplier must setup a relationship with multiple wireless service providers if they want their software made available to the world market. This is an impractical and expensive endeavor if a software supplier creates a program with the intent to distribute the software throughout the world to wireless users. Conversely, the wireless service provider has limited resources and cannot enter into a license agreement with the majority of software developers simply because there are so many. This deprives the wireless users from quickly and efficiently accessing most software.

Even if a software supplier did go through the overwhelming task of creating such relationships with each wireless service provider, there is no consistent technique used by wireless providers that allows a software supplier to bill for anything other than each download of the software. Users might not be willing to pay an amount of money equal to that paid for programs used on a personal computer. Accordingly, an alternative means for billing is desirable that allows a service provider to extract fees for services other than the mere downloading of an application. For example, a supplier may want to charge a fee for downloading a program, and then extract an additional use fee each time the program is used. This would allow a supplier to extract highly desirable recurring revenues from system users.

What is needed is a method, apparatus, and article of manufacture that provides a billing technique allowing a system user to be billed using a flexible methodology. For example, a user might be charged a download fee and ten-cents each time the application is used. In another example, the user might be charged a one-dollar fee per month for the software to be available to the user.

To accommodate various different communication devices used by a wireless communication system—such as PDAs, code division multiple access (CDMA) mobile units, personal computers, or GSM mobile telephones—the apparatus might contain both a server used to bill the system user and an application program interface (API). The interface allows the various communication devices to execute the software.

SUMMARY OF THE INVENTION

Broadly, the present invention relates to billing (invoicing) systems. More particularly, the invention concerns a method, apparatus, and article of invention that allows a user of a communication system to be invoiced using a flexible methodology.

The discussion and descriptions that follow address invoice systems in the context of wireless communication systems. However, it should be understood that the present invention is not limited to such systems. It may be applied to wireless- or terrestrial-based communication systems, to combinations of systems, to communication networks, or to any communication, information, or entertainment system, or combination thereof, that offer services to a system user.

In one embodiment, the invention may be implemented to provide a method to invoice a system user for services. The invoice may be based upon flexible criteria that can be adapted depending upon the desired service. For example, a user may incur a one-time charge for loading a desired application, or the user may be charged a loading fee plus a recurring monthly fee for having continual access to the software. Further, a fee might also be charged for each time the software is used. In this context, software is used broadly and refers to all or part of the programs, procedures, rules, and associated data used by signal processing systems. For example, "software" may comprise application software, integrated software, and system software.

In another embodiment, the invention comprises an apparatus for implementing a desired invoicing method. The apparatus may include a digital signal processing device, a memory unit, and a transceiver unit for wireless communication systems. In yet another embodiment, the invention may comprise an article of manufacture containing machine executable digital signal information used to execute the methods of the invention.

The present invention provides its users with numerous distinct advantages. One advantage is that the service billing of system users may be customized as desired. A bill may be generated based upon numerous different criteria, with the monies collected being distributed to each of the contributing parties. This allows the contributing parties to secure payment for services without having to establish multiple relationships with numerous service providers. The invention also provides a number of other advantages and benefits that should be apparent from the following more detailed description of various embodiments of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF SELECTED EMBODIMENTS

FIGS. 1–5 illustrate examples of various apparatus, method, and article of manufacture aspects of the present invention. For ease of explanation, but without any limitation intended, these examples are described in the context of digital signal processing apparatuses.

Hardware Components and Interconnections

Figure 1:
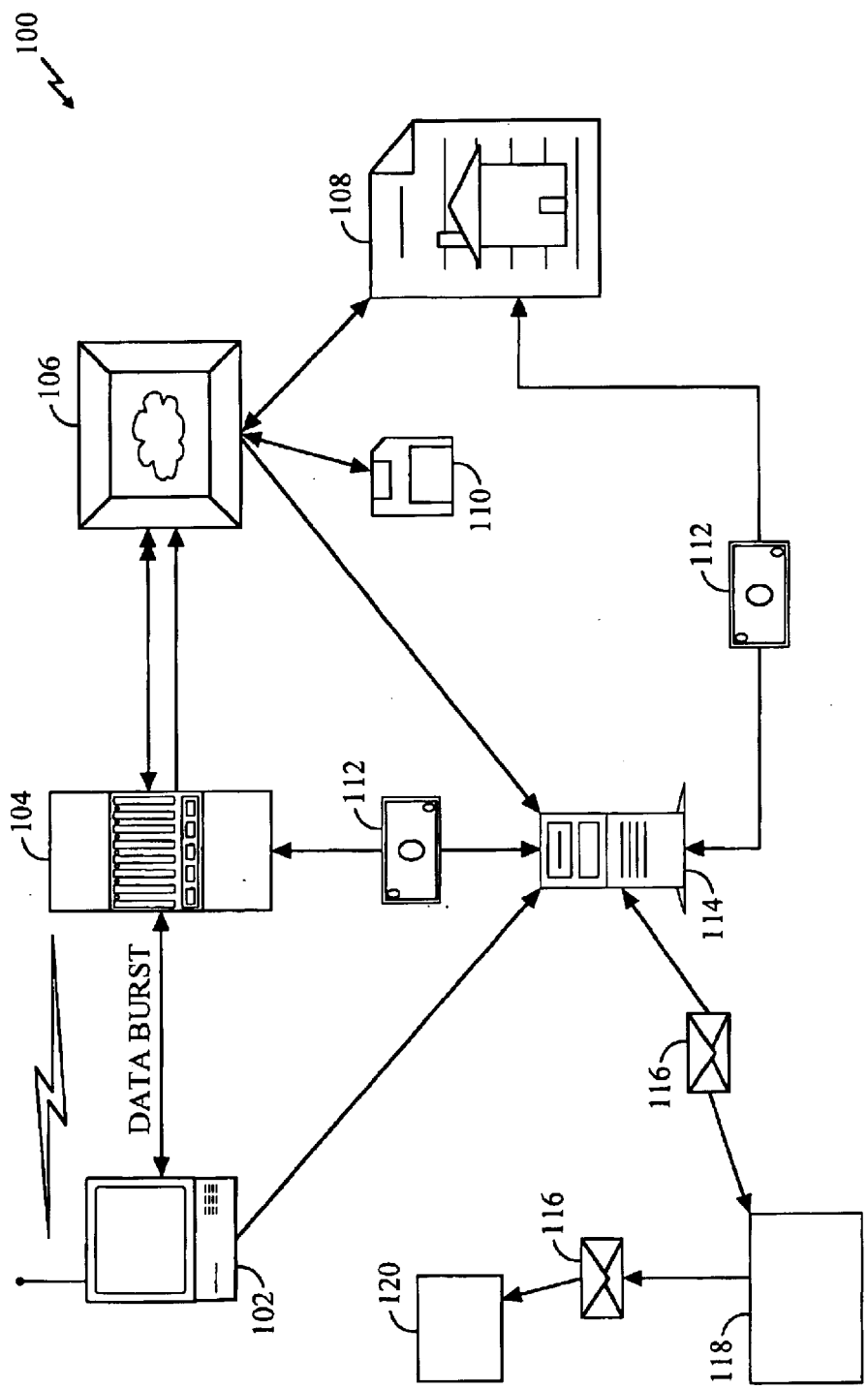
FIG. 1 is a communications system in accordance with the invention.

FIG. 1 illustrates one example of a digital data processing apparatus used to execute a sequence of machine-readable instructions and may be embodied by various different hardware components and interconnections. In FIG. 1, an apparatus (100) comprises a system user (102) communicatively connected to a wireless service provider (104). The service provider does not have to be solely a wireless service provider (WSP) as shown, but for purposes of this detailed description, the WSP (104) is used.

The WSP (104) may also provide Internet service, or a separate Internet service provider (ISP) (not shown) may be communicatively coupled to the WSP (104). Wireless communications between the WSP (104) and the system user (102) may be continuous, discontinuous, random, scheduled, bursty, or any other technique as desired depending upon the configuration of the apparatus (100). The communications may contain voice, data, facsimile, multimedia, or other information. For illustrative purposes, a data burst message is shown being communicated between the system user (102) and the WSP (104). Regardless of the arrangement, the system user (102) gains communication access, including Internet (106) access, via the WSP (104) in FIG. 1.

The Internet (106) allows a system user (102) access to numerous software and information sources. For example, a homepage (108) for a desired company may be accessed, and if desired, software (110) may be downloaded from the company's website to the system user (102). In other embodiments, other information could be downloaded as desired, such as clip-art, FTP files, data, and multimedia such as movies or video streams, just to name a few examples. The homepage (108) may include a device or tag (not shown) that allows identification of the company and the product to accompany the software or information downloaded to the system user (102).

If software or information is downloaded from the Internet (106), a charge or fee (112) may be associated with the download. Each fee (112) is communicated to a server (114) either directly from the homepage (108), the WSP (104), or the system user (102). Each fee (112) may be communicated to the server (114) from one or more of the sources shown in FIG. 1, or by any other technique, as long as the server (114) receives the information. The server (114) is a functional unit that provides specific services to the various elements comprising the apparatus (100), for example, billing services or information access services.

The server (114) generates an invoice (116) that is a recordation of the services used by the system user (102). The invoice (116) is forwarded to the payment location (120) communicatively linked to the server (114) via a transfer system (118). The transfer system (118) may be any transfer system, such as the United States Postal Office, direct withdrawal, electronic transfer, or electronic messaging that assures reliable receipt of the invoice (116) at the payment location (120) specified by the system user (102). The payment location may be the system users (102) home, office, financial account, or any other place where selected by the system user (102).

Figure 2:
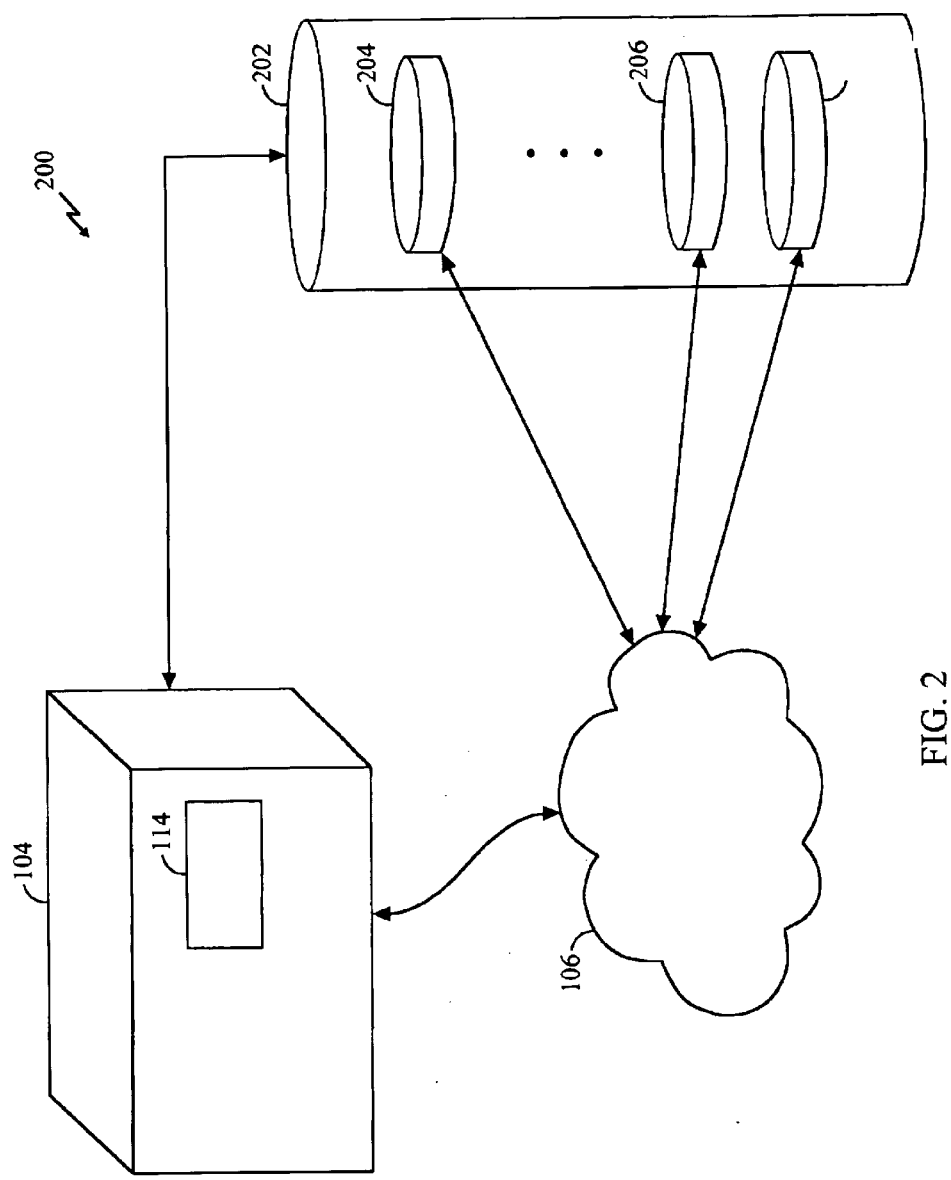
FIG. 2 illustrates a digital data processing apparatus in accordance with the invention.

Another example of a digital data processing apparatus of the invention is shown in FIG. 2. In this embodiment, an apparatus (200) comprises the server (114) shown as an element of the WSP (104), although the server (114) may be separate from the WSP (104). The server (114) is communicatively coupled to a resource center (202) that is communicatively coupled to the WSP (104). For example, the resource center (202) is accessed via the Internet (106). In another embodiment, the resource center (202) is an element of the WSP (104). Conceptually, the resource center (202) is a location where a system user (102) can gain access to a variety of selected software and information such as clip-art, FTP files, application programs, and other items as discussed above. This software and information can be downloaded by the system user (102) as desired and as available.

In one embodiment the resource center (202) may comprise a limited selection of software application programs—illustrated as applications 204, 206, and 208 in FIG. 2—offered by the WSP (104) to the system user (102) as part of wireless service "enhancement" program. The system user (102) may be charged for access to the resource locator (202), for use of a specific program, or separately for both access to and use of the program. This example is but one of many embodiments of the resource center (202). Other embodiments will be readily apparent to one skilled in the art after reading this detailed description.

Figure 3:
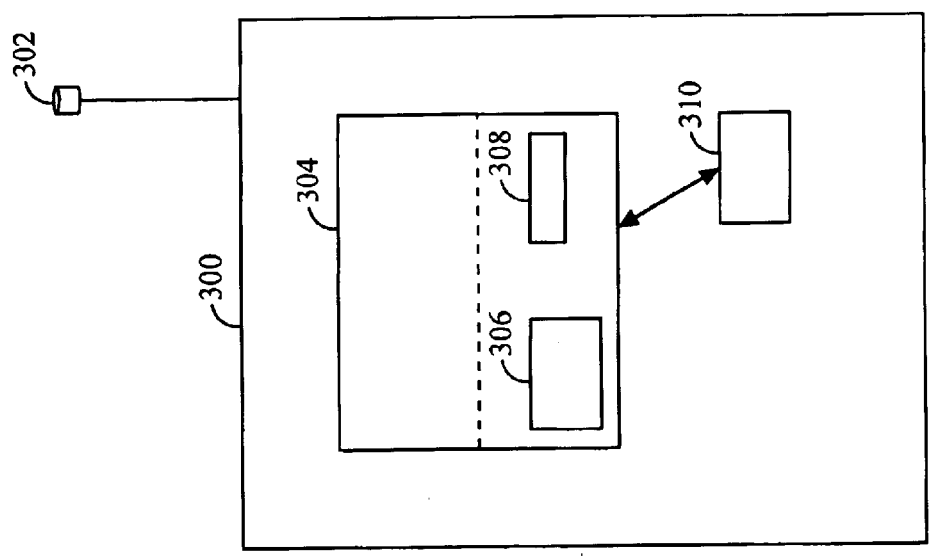
FIG. 3 is a block diagram of a wireless mobile apparatus in accordance with the invention.

FIG. 3 shows a mobile apparatus (300) representing one embodiment of the system user (102) shown in FIG. 1. The mobile apparatus (300) comprises an antenna (302) connected to a transceiver (not shown) for receiving wireless communications. The wireless communications may include downloaded application programs that can be executed, or stored for later use, by the mobile apparatus (300). The apparatus (300) may include one or more application program interface (API) (304) employed by the mobile apparatus (300) to interact with application programs. The API (304) is a functional interface supplied either by the operating system used by the mobile apparatus (300) or by a separate program that allows a program to use specific data or functions of the operating system or the program. For example, in virtual telecommunications access method (VTAM) programs, it is the language structure used in control blocks so that application programs can reference them and be identified to VTAM.

The API (304) is communicatively coupled to a storage (306), a timer (308), and a processor (310). The processor (310) and the storage (306) are used to coordinate and store information used by the mobile apparatus (300), such as downloaded programs. In another embodiment, the storage (306) could be used to store billing data reflecting charges and fees incurred by a system user for wireless service usage, Internet or resource center access charges, or fees for downloaded information. If desired, the timer (308) is utilized to coordinate the transfer of this stored billing information to the server (114) shown in FIG. 1.

Operation

Figure 4:
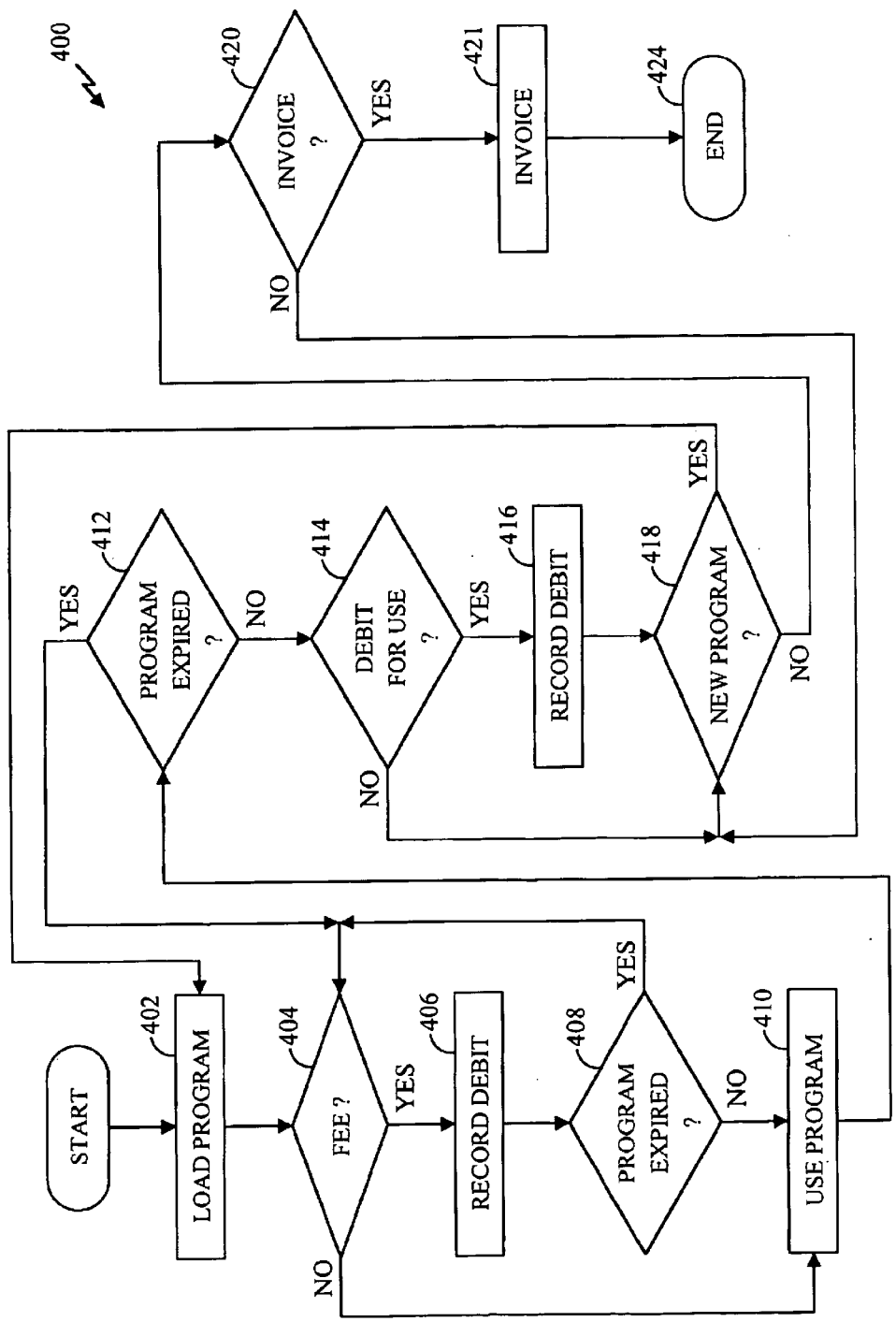
FIG. 4 is a flow diagram of one method of the invention.

FIG. 4 is a flow diagram of one method (400) that may be executed by a communications system such as the system (100). Although the method (400) is discussed in the context of a communication system having at least one wireless link, other embodiments can be implemented in systems having a variety of links. For example, some or all of the links connecting various system users may be terrestrial, wireless, digital copy, hard copy, or any other communication link that allows a communication to be transferred from one location to another location.

In the loading step (402) of the method, a copy of desired software is loaded from a second location to at least one first location. In one embodiment, the first location might be a mobile wireless unit, and the second location might be the home page of a software provider. For purposes of this discussion, the term software refers original software or a copy of software, as defined above, wherein an application program is a software program that is executed to perform a desired function. For example, suppose a software program is loaded that allows numerous first locations to play a game and compete against each other. In this embodiment, each first location will be loaded with the game program. The loading process is typically a download, however, data and information relating to each first location receiving the downloaded program, such as the first locations identifier, also may be uploaded to the second location.

Either immediately before, concurrent to, or immediately after software is loaded to the first location, a fee may be incurred as shown in debit step (404). Generally, this fee is reflected as a debit to the first location that authorized the loading of the program. This first location may be debited only for the program loaded to that location, or it may be debited for each program loaded to all first locations selected. If a debit is incurred, the debit is recorded in the recording step (406).

At a point in time after the program is downloaded, either before or after the program is executed, the option to use the program may expire as indicated in the expire steps (408, 412). If the use option expires, then the method (400) returns to the debit step (404) and if a fee is charged, another debit is recorded in the recording step (406). This provides the flexibility to not charge for program usage, but to debit the first location for the time the loaded program remains available to be used by the first location.

Regardless of the debit structure desired, the first location or locations in the use step (410) then execute the program. Each time the program is used, a fee may be incurred in the debit step (414) and recorded in the recording step (416). In other versions, a fee is not charged based upon each use of the program or a fee is charged based upon every "n" usage of the program. For example, if n=10, then a fee is charged each time the program has been used 10 times. If a use-fee is incurred by using the program, the fee is debit to the first location in the debit step (414) and recorded in recording step (416). If no use fee is charged, then the method (400) continues to the new program step (418).

In the new program step (418), a second program may be loaded to the first location and the method (400) returns to the load step (402). If no new program is loaded, then at a selected time at time step (420), an invoice is constructed at the invoicing step (422) reflecting the debits incurred by the first location. The debits may include, but are not limited to, the debits for program access, program loading, program usage, Internet access, wireless communication service, terrestrial communication service, and invoicing fees. The invoice is communicated to a party responsible for the first location debits. The invoice may be communicated using one or more techniques, such as mail or courier service, electronic mail, wireless communication, carrier pigeon, or any other similar communication method.

In one embodiment, the debits used in invoicing step (422) are received from the first location. When software is downloaded, the debit is recorded at the first location and either stored for later communication to the server (114), shown in FIG. 1, or are communicated immediately once the software is successfully loaded. In another embodiment, the debits are received only from the second location in a similar fashion. In yet another embodiment, debits may be received from both the first location and the second location at the server (114). When this occurs, invoicing step (422) may include comparing debits received from a first location and a second location, allowing a software supplier to confirm that the first location has diligently communicated the debits to the server (114).

Regardless of the debit communication method used, the debits may be stored at a location and communicated to the server (114) at any time prior to the invoicing step (422). Ideally, in a preferred embodiment a debit communication would occur at a peak of system resource availability, however, this may not be practical. Further, a header or identification tag may be placed on a debit communication thereby allowing the server (144) to easily determine from which location a debit communication is received. The method ends at the end step (424).

Article of Manufacture

Such a method (400) may be implemented, for example, by operating the digital signal processor (310) shown in FIG. 3 to initiate the execution of a sequence of machine-readable data. Here, the term "machine readable data" is used broadly and comprises, for example, a machine readable language construct that species an operation and identifies operands (instructions), application programs, software configuration data, multimedia data, video data, and audio data. These data may reside in various types of storage units located either in the host communications system (100), the communications channels, the apparatus (300), or any other location accessible to the communication channels or the apparatus (300).

Figure 5:
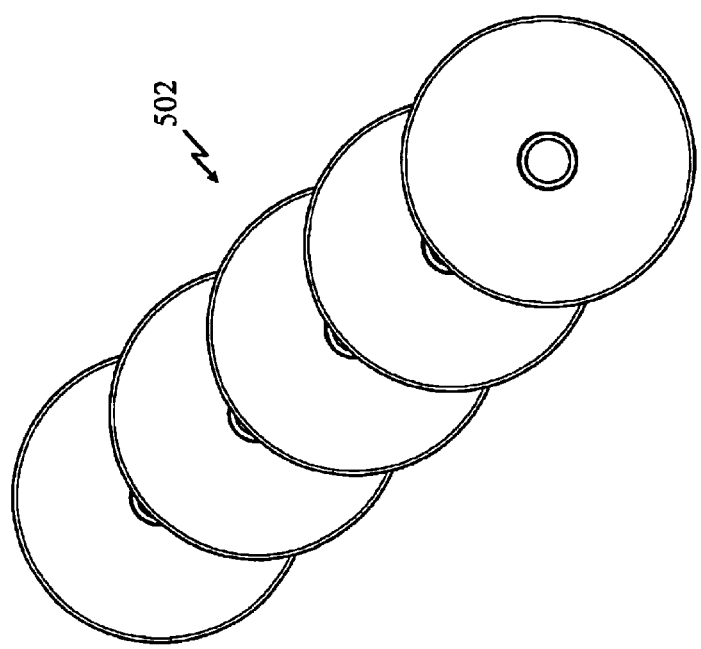
FIG. 5 is an illustration of two types of digital signal storage units in accordance with the invention.
Figure 5:
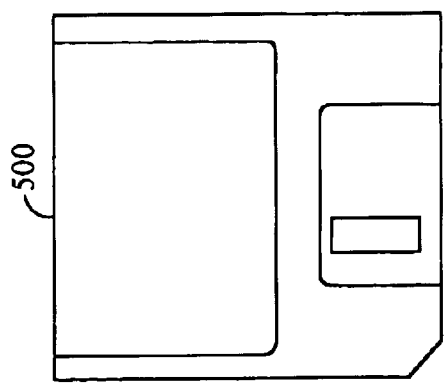

For example, the data may be contained in another data storage medium comprising various embodiments, such as a magnetic data storage diskette (500) or a redundant array of inexpensive disks (RAID) (502) shown in FIG. 5. Whether contained in a storage unit, the diskette (500) or the RAID (502), it should be understood that the instructions may also be stored in yet other types of storage mediums such as a direct access storage device (DASD) such as a conventional single disc hard drive, electronic read-only memory (e.g., ceramic disk—read only memory (CD-ROM), write-once-read-many (WORM)), optical storage device, paper punch cards, or data storage media. In an various embodiments, the machine-readable data may comprise or emulate lines of compiled "C-type" language, source code, object code, executable machine code, executable programs, data banks, or other types of commonly known data.

Other Embodiments

Despite the specific foregoing descriptions, ordinarily skilled artisans having the benefit of this disclosure will recognize that the apparatus, method, and article of manufacture discussed above may be implemented in an apparatus, system, method, or article of manufacture of different construction without departing from the scope of the invention. Similarly, parallel methods may be developed. As a specific apparatus example, one of the components such as the WSP (104) shown in FIG. 1 may provide multiple services, such as wireless service and Internet access service. The WSP (104) may also include the server (114).

What is claimed is:

1. A system for invoicing users of mobile wireless mobile devices comprising:

a wireless network;

a wireless mobile device connected to the wireless network and configured to receive software over the wireless network;

a resource center connected to the wireless network and configured to provide the software to the wireless mobile device over the wireless network; and a billing server connected to the wireless network and configured to receive a debit corresponding to execution of the software on the wireless mobile device wherein the billing server is configured to generate an invoice for the wireless mobile device;

wherein the software has a plurality of contributing parties wherein the billing server determines corresponding separate amounts for distribution to each of the contributing parties.

2. A system for invoicing users of mobile wireless mobile devices comprising:

a wireless network;

a wireless mobile device connected to the wireless network and configured to receive software over the wireless network;

a resource center connected to the wireless network and configured to provide the software to the wireless mobile device over the wireless network;

a billing server connected to the wireless network and configured to receive a debit corresponding to execution of the software on the wireless mobile device wherein the billing server is configured to generate an invoice for the wireless mobile device; and a second wireless mobile device connected to the wireless network and configured to receive software over the wireless network wherein the loading of the software on the second wireless does not have a separate debit apart from the debit received at the billing server.

3. A wireless mobile device capable of downloading and executing software comprising:

an application program interface to interact with downloaded application software;

a processor for executing the downloaded application software; and memory for storing the downloaded application software;

wherein the application program interface is operable to store a debit in the memory in response to the detection of interaction between the wireless mobile device and the downloaded application software;

wherein the debit is used to generate an invoice for the wireless mobile device;

wherein the debit includes data identifying a contributing party and a software fee associated with the interaction; and wherein the debit further includes a second software fee associated with the interaction of the downloaded application software with a second wireless mobile device.

* * * * *